April 21, 1931.  S. C. HATFIELD  1,802,148
FLEXIBLE SHAFT CONNECTION
Filed March 9, 1927  2 Sheets-Sheet 2

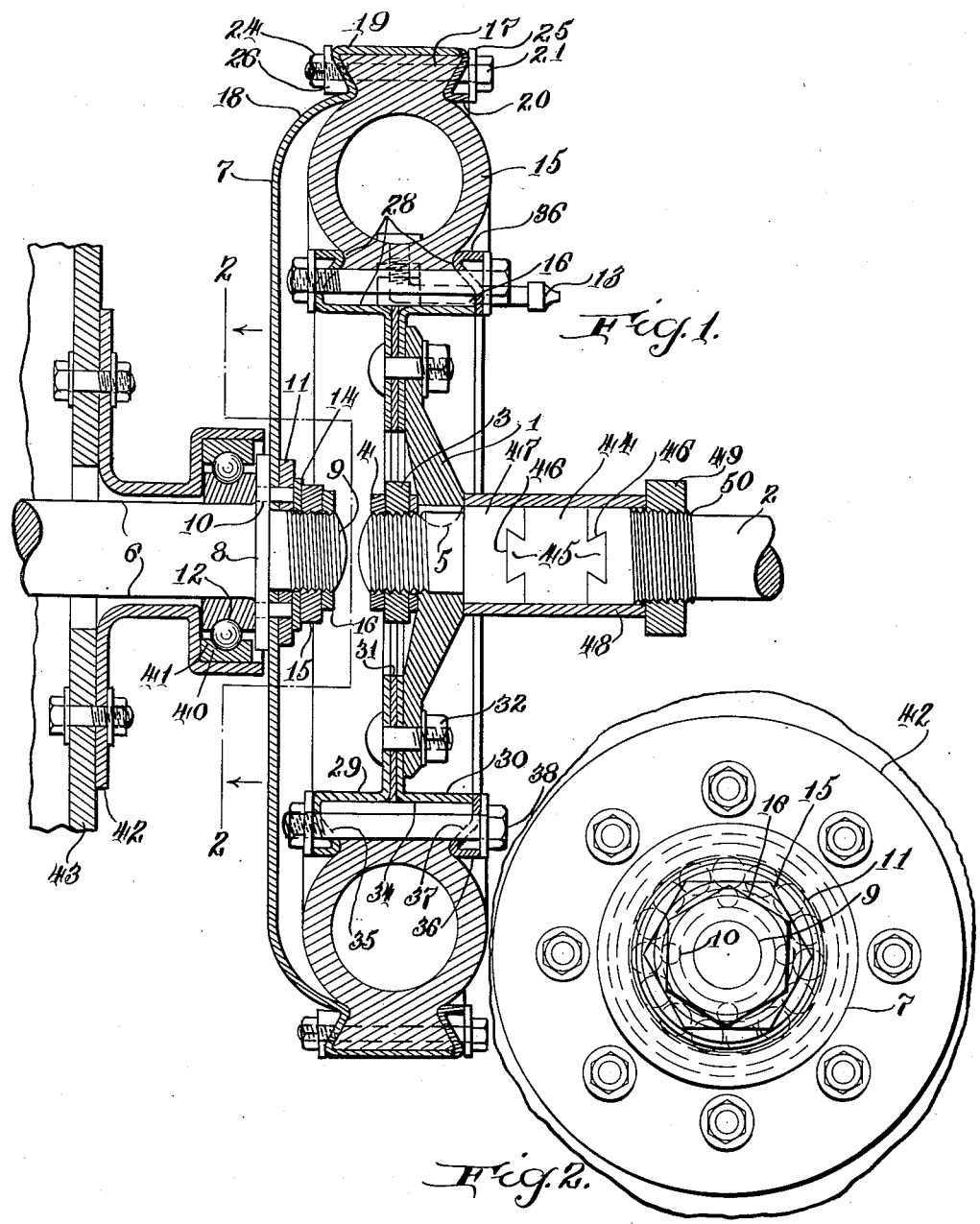

Patented Apr. 21, 1931

1,802,148

UNITED STATES PATENT OFFICE

SCHUYLER C. HATFIELD, OF BALTIMORE, MARYLAND

FLEXIBLE SHAFT CONNECTION

Application filed March 9, 1927. Serial No. 173,930.

Flexible shaft connections or universal joints of various designs have been produced, most of them being constructed entirely of rigid material with two or more bearings at right angles to each other and at right angles to the shaft axis to provide for the universal action, but others have been made of flexible material, as fibroid and rawhide, ordinarily in the form of one or more disks connected at spaced points to the respective sections of shaft to be universally or flexibly connected, the flexible material between the points of connection providing the play or universal action which is the object of the construction.

The first mentioned type of joint with the multiple pivotal action is subject to failure or at least to deterioration on account of the wear of the bearing surfaces, resulting in continually increasing play and noise if not in actual failure. This construction is also objectionable on account of the expensive work and material necessary to produce it.

The flexible disk type of joint made of fibrous material or other flexible material, as fibroid, rubber or rawhide, is much cheaper, but deterioration by enlargement of the bolt holes with a consequent tendency to get out of line and produce noise and vibration is comparatively rapid.

The present invention relates to a universal joint or flexible shaft connection which is dependent for its flexibility on rubber, rubber and fabric or other equivalent material, the construction being such that there are no bearings in the joint or connection proper to wear and produce play and vibration, and the flexible member is of such construction, and connected to the respective shaft members in such a manner as to practically eliminate deterioration, the life of the joint or flexible connection being of indefinite length and practically free from deterioration evidenced by wear, looseness and tendency to play, the parts being further so arranged that if any looseness should develop it can be immediately taken up and the play eliminated without difficulty.

The preferred construction of the invention comprises a flexible member in annular form having inner and outer beads or equivalent connecting means with inner and outer bead clamping, or other securing means on the respective shaft ends being flexibly connected.

In the accompanying drawings I have illustrated a flexible shaft connection or universal joint embodying the features of my invention in the preferred form.

In the drawings:

Figure 1 is a section taken on a diametrical plane including the axis of the shaft and joint.

Figure 2 is a sectional elevation in a plane transverse to the axis, the same being taken on the line 2—2 of Figure 1 looking in the direction of the arrows.

Figure 3:
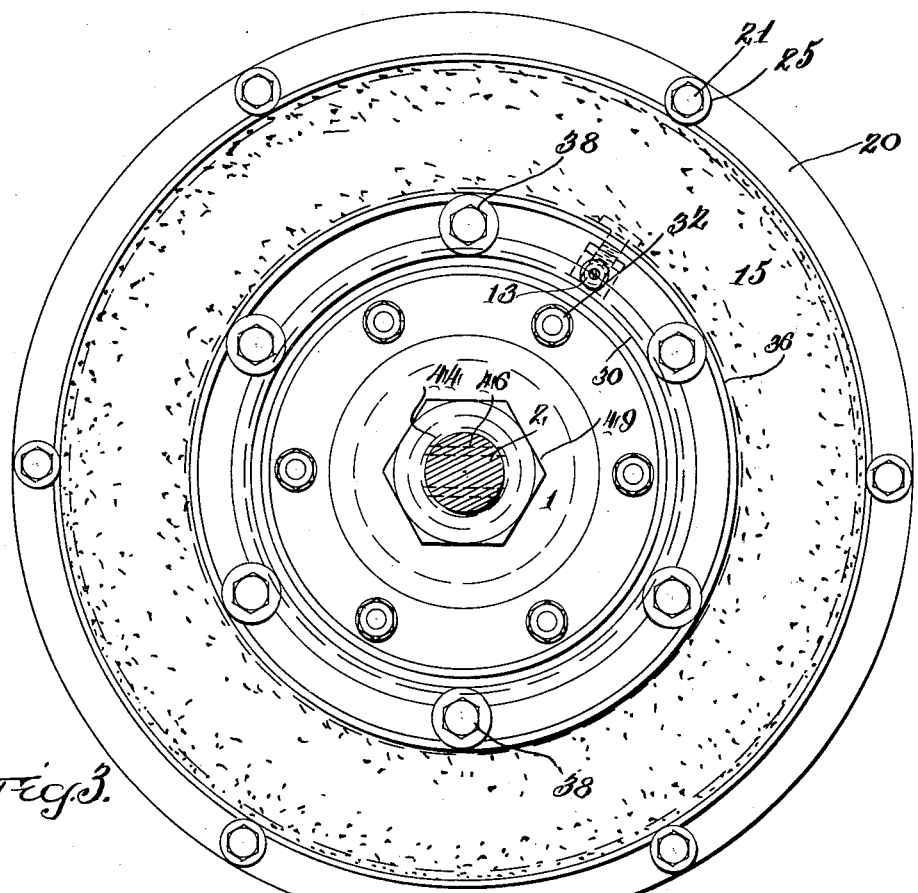
Figure 3 is an elevation of the universal joint or flexible shaft connection taken on a plane at right angles to Figure 1 and looking from the right in Figure 1.
Figure 4:
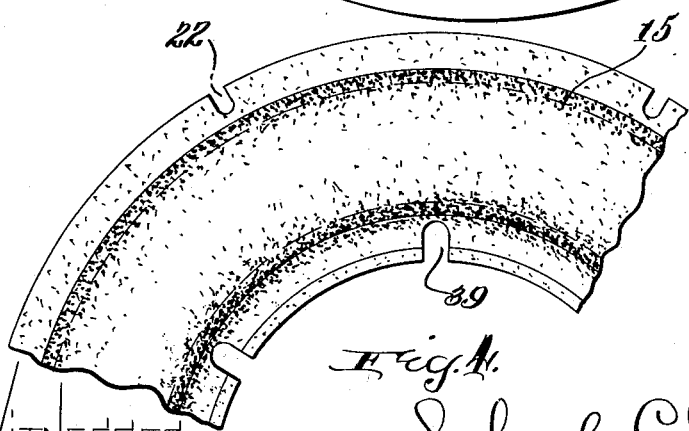
Figure 4 is a fragmentary view of the flexible member of the universal joint, the said member being removed from the remainder of the construction and the view being taken from the right in Figure 1.

Referring to the drawings by numerals, each of which is used to indicate the same or similar parts in the different figures, the universal joint or flexible drive shaft connection in the preferred form, as shown, comprises a flange or small inner disk 1 secured to the shaft end 2 in any suitable manner as by means of nut 3 and lock nut 4, the disk being held against rotation relatively to the shaft in any suitable manner, as by means of a key 5. A second shaft end 6, which is to be flexibly connected to the shaft end 2 by means of the flexible drive or universal joint, which is the subject of the invention, is provided with a relatively large outer disk 7 secured to the shaft end 6 to rotate therewith in any suitable manner. In accordance with the construction shown, the shaft end 6 is flanged at 8 and provided with a threaded portion 9 projecting beyond the flange and through the disk 7.

In the construction shown, a plurality of pins 10 are passed through the flange 8 and disk 7, being further seated in a washer 11 on the opposite side of the disk 7 from the flange 8. These pins are held in position on one side by means of the bearing ring 12 on the shaft 6 which ring engages the ends of the pins, and on the other side by a washer 14 which is forced against the ends of the pins by a nut 15 on the thread 9, which is in turn held by a lock nut 16.

The important feature of the invention relates to the provision of a flexible connection between the shaft ends and while the features described contribute to the accomplishment of this result, they are incident to what is at present the preferred form of the invention, the essential feature of the invention residing in the flexible member shown at 15 in the form of a ring of flexible material having inner and outer clampable means shown as an inner bead 16 secured to the smaller disk 1 and an outer bead 17 secured to the outer or larger disk 7. The member 15 is shown as hollow and may be formed of any suitable material, as rubber or rubber and fabric, but the hollow construction and the exact nature of the flexible material are not regarded as essential to the invention in its broader scope. The member 15 may be inflated by way of valve tube 13. This protects the flexible material in the side walls and different degrees of inflation give a variation of the flexibility of the joint.

In the preferred construction, the large outer disk 7 and the small or inner disk 1 are provided at their periphery with bead engaging means whereby the outer periphery of the flexible member is secured to the outer disk and the inner periphery to the inner disk.

In the form illustrated, the outer disk 7 is deflected as to its outer peripheral portion at 18 to the right in Figure 1 toward the inner disk 1. This deflected peripheral portion 18 is formed at its extreme outer edge into an outer rim or bead engaging member 19, the bead engaging portion 19 including a removable locking ring 20, the entire bead engaging member being formed to enclose and engage the bead on the three exposed sides thereof. The locking ring 20 is secured by means of bolts 21 extending through the bead engaging member 19 from side to side and through suitable notches or apertures 22 in the bead. The heads of the bolts 21 and the nuts 24 thereon are suitably supported by means of washers 25 and 26 which may be separate or secured to the bead engaging members. The members 25 and 26, as shown, are shaped, particularly the washers 26, to conform to the outside surfaces of said members, and they may be spot welded, or otherwise secured to rim members 19 and 20.

The inner bead 16 may be secured to the outer perihpery of the inner disk 1 in any suitable manner. As shown, the bead is clamped to the disk by means of an inner rim member 28 which is composed of a series of sheet metal rings 29, 30 and 31 bolted to the periphery of the disk 1 by nuts and bolts 32. The inner one of said rings 29 is shaped to enclose one-half of the inner peripheral surface 34 of the inner bead and the back side surface 35 of the same. The central ring 31 is in the form of a large washer, merely bearing as to its peripheral edge on the inner surface 34 of the bead and the outer ring 30 is of L shaped cross section, merely bearing on and supporting the other half of the inner peripheral surface 34 of the inner bead. The inner rim member 28 also includes a bead locking ring 36 which conforms to the front peripheral surface 37 of the bead, both beads being preferably of tapering cross section, the reduced side of the taper being turned toward the shaft. The locking rings 36 and 20 present correspondingly inclined surfaces to the bead.

The locking ring 36 is secured to the inner rim member 28 by means of peripherally spaced bolts 38 passed through the ring 36 and through the opposite side of the inner rim member 28, as shown, and through notches or apertures 39 in the inner periphery of the inner bead 16, said bolts being parallel to the axis, as are the bolts 21.

As shown, the shaft end 6 is mounted in a ball bearing 40, the inner bearing ring of which is secured to the shaft end as previously described, the outer bearing ring 41 being mounted in any suitable support 42 which may be secured to a motor casing, differential housing, transmission casing or the casing 43, or to the frame of any other unit which the shaft drives, or by which it is driven.

For convenience in assembling and disassembling the universal joint, it may be found desirable or necessary in a good many instances to separate the inner disk 1 from the shaft end 2. The present disclosure includes a construction adapted to this purpose. It consists of a cylindrical block 44 having dovetailed keys 45 engaging corresponding dovetailed grooves 46 in the shaft section 47 to which the disk 1 is secured and in shaft end 2, the said keys and grooves being at right angles to the axis and preferably diametrically placed. The block 44 and the shaft section 47 and the end of the shaft 2 are enclosed in a sleeve 48 which retains the parts in line and in assembled relation with keys 45 in grooves 46. The sleeve is secured by means of a nut 49 engaging a thread 50 on the shaft 2, which is enlarged at and beyond the thread for obvious reasons. By means of the nut 49 the sleeve 50 may be tightened up against the disk 1.

To separate the section 47 from the shaft 2 the nut is removed, the sleeve 48 is slid to the right in Figure 1 and the block 44 is removed by sliding in the direction of the keys 45 and slots 46.

The manner of assembling, using and disassembling for replacement of parts, or for any purpose, will be clearly understood from the description.

I have thus described specifically and in detail a single embodiment of my invention in the preferred form in order that the nature and operation of the same may be clearly understood. However, the specific terms herein are used descriptively rather than in a limiting sense, the scope of the invention being defined in the claims.

What claim as new and desire to secure by Letters Patent is:

1. Means for connecting two shaft ends to rotate one of said shaft ends from the other and to provide for a slight disalignment of said shaft ends comprising a carrier on one shaft end and extending outward radially therefrom, bead clamping means concentric with said shaft on said carrier, means for removably securing said carrier to its shaft end, the second shaft end having an extension and means removably securing the same to the second shaft end, a radial carrier secured to said extension, said carrier having bead engaging means secured to its outer periphery, an annular hollow member of flexible material having inner and outer beads secured to said respective bead clamps and forming a flexible connection between said shaft ends.

2. Means for connecting two shaft ends to rotate one of said shaft ends from the other and to provide for a slight disalignment of said shaft ends comprising a carrier on one shaft end and extending outward radially therefrom, bead clamping means concentric with said shaft on said carrier, means for removable securing said carrier to its shaft end, the second shaft end having an extension and means removably securing the same to the second shaft end, a radial carrier secured to said extension, said carrier having bead engaging means secured to its outer periphery, an annular member of flexible material having inner and outer beads secured to said respective bead clamps and forming a flexible connection between said shaft ends.

3. Means for connecting two shaft ends, to rotate one of said shaft ends from the other and to provide for disalignment of said shaft ends, comprising a disc on one said shaft end, a hollow annular flexible member having inner and outer peripheral beads with means for securing one said bead to said disc, means for securing said disc to said shaft end, bead clamping means engaging the other bead, the same being in the form of a ring, an extension removably mounted on the other shaft end, and a radial member secured to said extension with means for removably securing said radial member to the last mentioned bead clamping means, the means for securing the disc to the first mentioned shaft end being made accessible by the removal of said extension and radial member.

Signed by me at Baltimore, Maryland, this 7th day of March, 1927.

SCHUYLER C. HATFIELD.